US008615575B2

(12) United States Patent
Aaron et al.

(10) Patent No.: US 8,615,575 B2
(45) Date of Patent: Dec. 24, 2013

(54) DEVICES, METHODS, AND COMPUTER-READABLE MEDIA FOR PROVIDING QUALITY OF SERVICE OPTIMIZATION VIA POLICY-BASED REARRANGEMENTS

(75) Inventors: Jeffrey Aaron, Atlanta, GA (US); Robert Streijl, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 292 days.

(21) Appl. No.: 12/253,197

(22) Filed: Oct. 16, 2008

(65) Prior Publication Data

US 2010/0100613 A1  Apr. 22, 2010

(51) Int. Cl.
*G06F 15/173* (2006.01)
*H04L 12/28* (2006.01)

(52) U.S. Cl.
USPC .............. 709/223; 709/226; 370/395.21

(58) Field of Classification Search
USPC ............ 709/223, 226; 455/453; 379/230, 379/395.21
See application file for complete search history.

(56) References Cited

U.S. PATENT DOCUMENTS

| | | | |
|---|---|---|---|
| 6,272,545 B1 | 8/2001 | Flanagin et al. | |
| 6,553,232 B1 | 4/2003 | Shaffer et al. | |
| 6,826,150 B1 * | 11/2004 | Bhattacharya et al. | 370/230 |
| 6,947,750 B2 * | 9/2005 | Kakani et al. | 370/395.21 |
| 7,630,986 B1 | 12/2009 | Herz et al. | |
| 7,796,190 B2 | 9/2010 | Basso et al. | |
| 7,904,360 B2 | 3/2011 | Evans | |
| 7,969,990 B2 | 6/2011 | Shmueli et al. | |
| 7,975,062 B2 | 7/2011 | Krikorian et al. | |
| 2003/0154242 A1 | 8/2003 | Hayes et al. | |
| 2004/0042489 A1 | 3/2004 | Messick et al. | |
| 2004/0253940 A1 | 12/2004 | Andrews | |
| 2005/0157660 A1 * | 7/2005 | Mandato et al. | 370/254 |
| 2006/0020646 A1 | 1/2006 | Tee et al. | |
| 2006/0025149 A1 | 2/2006 | Karaoguz et al. | |
| 2006/0092037 A1 | 5/2006 | Neogi et al. | |
| 2007/0050492 A1 * | 3/2007 | Jorgensen | 709/223 |
| 2007/0064673 A1 * | 3/2007 | Bhandaru et al. | 370/351 |
| 2007/0133428 A1 | 6/2007 | Taylor et al. | |
| 2007/0162966 A1 | 7/2007 | Agrawal et al. | |
| 2007/0198682 A1 | 8/2007 | Pazhyannur et al. | |
| 2007/0202923 A1 | 8/2007 | Jung et al. | |
| 2008/0008188 A1 * | 1/2008 | Buga et al. | 370/395.21 |
| 2008/0240444 A1 | 10/2008 | Shuster | |
| 2009/0005071 A1 | 1/2009 | Forstall et al. | |
| 2009/0177721 A1 | 7/2009 | Mimatsu | |
| 2009/0328087 A1 | 12/2009 | Higgins et al. | |
| 2010/0005483 A1 | 1/2010 | Rao | |
| 2010/0082567 A1 | 4/2010 | Rosenblatt et al. | |
| 2010/0099388 A1 | 4/2010 | Aaron et al. | |
| 2010/0099392 A1 | 4/2010 | Aaron et al. | |
| 2010/0100519 A1 | 4/2010 | Aaron et al. | |
| 2010/0100822 A1 | 4/2010 | Aaron et al. | |
| 2010/0146527 A1 | 6/2010 | Craib et al. | |

OTHER PUBLICATIONS

U.S. Appl. No. 13/495,920, filed Jun. 13, 2012, Aaron et al.

* cited by examiner

*Primary Examiner* — Peling Shaw
(74) *Attorney, Agent, or Firm* — Woodcock Washburn LLP

(57) ABSTRACT

Devices, methods and computer-readable media for providing quality of service optimization via policy-based rearrangements. Customers are grouped for potential rearrangement. Multiple alternative options are generated for a particular group using policy rules. Policy rules for the particular group are used to evaluate each option using common metrics. Policy rules are used to select a best option for the particular group. The best option for the particular group is implemented.

18 Claims, 4 Drawing Sheets

DEVICES, METHODS, AND COMPUTER-READABLE MEDIA FOR PROVIDING QUALITY OF SERVICE OPTIMIZATION VIA POLICY-BASED REARRANGEMENTS

CROSS-REFERENCE TO RELATED APPLICATIONS

This application is related to the following co-pending and commonly-assigned patent applications, which are hereby incorporated herein by reference in its respective entirety:

"DEVICES, METHODS, AND COMPUTER-READABLE MEDIA FOR PROVIDING CONTROL OF SWITCHING BETWEEN MEDIA PRESENTATION SCREENS" to Jeffrey Aaron et al., having Ser. No. 12/253,003 and;

"DEVICES, METHODS, AND COMPUTER-READABLE MEDIA FOR PROVIDING CALENDAR-BASED COMMUNICATION SYSTEM SERVICES" to Jeffrey Aaron et al., having Ser. No. 12/253,137 and;

"DEVICES, METHODS, AND COMPUTER-READABLE MEDIA FOR PROVIDING SERVICES BASED UPON IDENTIFICATION OF DECISION MAKERS AND OWNERS ASSOCIATED WITH COMMUNICATION SERVICES" to Jeffrey Aaron et al., having Ser. No. 12/253,157 and "DEVICES, METHODS, AND COMPUTER-READABLE MEDIA FOR PROVIDING BROAD QUALITY OF SERVICE OPTIMIZATION USING POLICY-BASED SELECTIVE QUALITY DEGRADATION" to Jeffrey Aaron et al., having Ser. No. 12/253,178.

BACKGROUND

Embodiments herein relate to systems, methods, and computer-readable media for providing services based upon adjustment of quality of service. More particularly, the embodiments relate to devices, methods and computer-readable media for providing quality of service optimization via policy-based rearrangements.

Wireless cell phone technology offers the convenience of keeping in contact with others at any place and at any time. Cell phones may connect wirelessly with a cell phone network to offer data and communication services. Cell phones often combine communication, digital photography, video game functions, video and audio-video viewing functions, etc. To take advantage of this added functionality, hybrid cell phones that combine short-range (WiFi), high-speed Internet access and cellular service have been marketed to allow users to make connections using a local wireless Internet access point and seamlessly switch over to a cell phone network whenever necessary. Moreover, cellular carriers have spent billions of dollars to upgrade their systems for high-speed data. The upgraded networks offer wide coverage that exceeds WiFi's short range.

The computing power and the functionality now present on mobile devices enables many new services and functions to be provided to communication system customers. In addition, such new services and functions present opportunities for new revenue streams for system carriers. By providing the new services and functions, the carriers are able to develop long-term relationships with both residential and corporate subscribers.

Control of applications, services and networks associated with a communication system can be achieved using a policy architecture. A policy architecture may include a rules engine plus enforcement points in applications and throughout the network. Accordingly, wireless systems are being built upon the promise of delivering new and different types of high-speed multimedia services. In this way, service providers can extend their offerings beyond basic network services to include also value-added services and specialized application services. The service management concept involves the ability to create, supervise, update and remove services on a networking platform so that service providers can deliver the new services adapted to the customer requirements and experiences, meeting the customer demand while fulfilling customer expectations.

Many important new applications and services are quality sensitive. Current Quality of Service ("QoS") approaches treat users individually. However, when multiple users share a specific limiting resource, e.g., a shared network connection and/or bandwidth, meeting the QoS requirements of all users is difficult. This is aggravated by available resources changing due to many various factors.

Often in a shared service provider resource environment, some resources are taken from various users and provided to a user that needs them to meet the QoS needs of customers. However, simply giving one user enough resources to support their need is not sufficient. Complicating matters further, the combinations and possibilities involved in making rearrangements, changing various network and application parameters, changing network connections and/or actual networks, routing changes, etc. are too numerous to implement quickly and easily. In many cases, attempting to achieve QoS requirements for all users using the combinations quickly becomes much too complex and would generally take an expert to figure out an acceptable solution, which of course must be customized for each situation. Such an expert would need to determine the need, the associated possibilities, the potential ramifications, select a rearrangement, and implement the rearrangement. Currently, this is not possible.

It is respect to these and other considerations that the embodiments described herein have been made.

SUMMARY OF THE INVENTION

According to exemplary embodiments, methods, computer-readable media, and devices provide quality of service optimization via policy-based rearrangements.

According to one embodiment, customers are grouped for potential rearrangement, multiple alternative options are generated for a particular group using policy rules, policy rules for the particular group are used to evaluate each option using common metrics, policy rules are used to select a best option for the particular group; and the best option for the particular group is implemented.

These and other features and advantages, which characterize the embodiments, will be apparent from a reading of the following detailed description and a review of the associated drawings. It is to be understood that both foregoing general description and the following detailed description are exemplary and explanatory only and are not restrictive of the invention, as claimed.

DETAILED DESCRIPTION

In the following description of the embodiments, reference is made to the accompanying drawings that form a part hereof, and in which is shown by way of illustration the specific embodiments in which the invention may be practiced. It is to be understood that other embodiments may be equally applicable to providing quality of service optimization via policy-based rearrangements.

Figure 1:
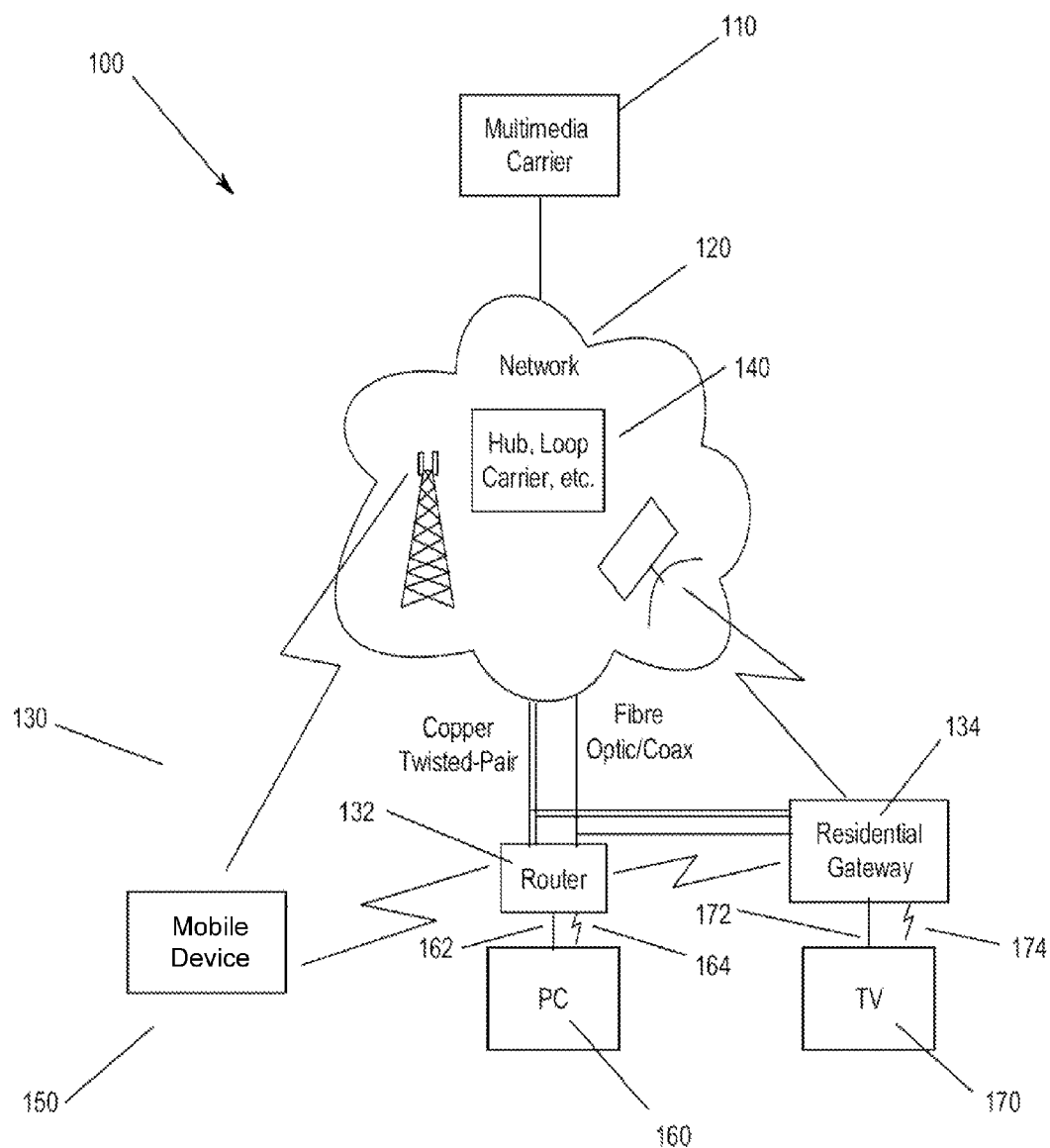
FIG. 1 illustrates a general block diagram of a media and communication network according to an exemplary embodiment.

FIG. 1 illustrates a general block diagram 100 of a media and communication network according to an exemplary embodiment. A multimedia carrier 110 is configured to provide hardware and software infrastructure for the delivery of content and for providing communication channels for subscribers or other users. Examples of communication channels include telephone services, Internet access, voice-over-IP, interactive television and gaming, etc. The multimedia carrier 110 acquires programming from content providers and encodes the content. The multimedia carrier 110 may also add local programming and provide additional digital services such as video on demand, and storage for content according to user directions.

The multimedia carrier 110 is coupled to a network 120 for distributing the content, providing Internet access, telephone services, etc. The network 120 provides the intermediate infrastructure between the point-of-delivery 130 and the multimedia carrier 110. The network 120 may be configured to provide one or more or the intermediate infrastructure 140 for television content delivery, plain-old-telephone system, satellite television, Internet services, wireless communications, such as cellular mobile phone services, etc. Accordingly, the network may include hub offices, IP service offices, local loop carrier facilities, satellite carrier facilities, communication satellites, telecom point-of-presence, mobile switching centers, base stations, and distribution nodes.

At the point-of-delivery 130, a router 132 may be used to provide digital services, such as Internet access. A computer or other Internet-capable device 160 may be coupled to the router 132 by a network cable 162 or wirelessly 164. A residential gateway 134 may be used to provide content, e.g., IPTV, to multimedia-capable viewing devices, such as a television, via a cable 172 or wirelessly 174. A mobile device 150 operates within a mobile operating system. Examples of such mobile devices 150 may include cell phones, smart phones, handheld computers, personal digital assistants, etc.

In addition, mobile devices 150 may be configured to use location-based services ("LBS") to receive information specific to a location. Some examples of location-based services include requesting the nearest business or service, such as an ATM or restaurant, and finding a friend. A service provider may obtain the location of a mobile device from a global positioning system ("GPS") circuit built into the device, or by using radiolocation and triangulation based on the signal-strength of the closest cell-phone towers (for phones without GPS features). Any other suitable means of obtaining or estimating location may also be used.

Figure 2:
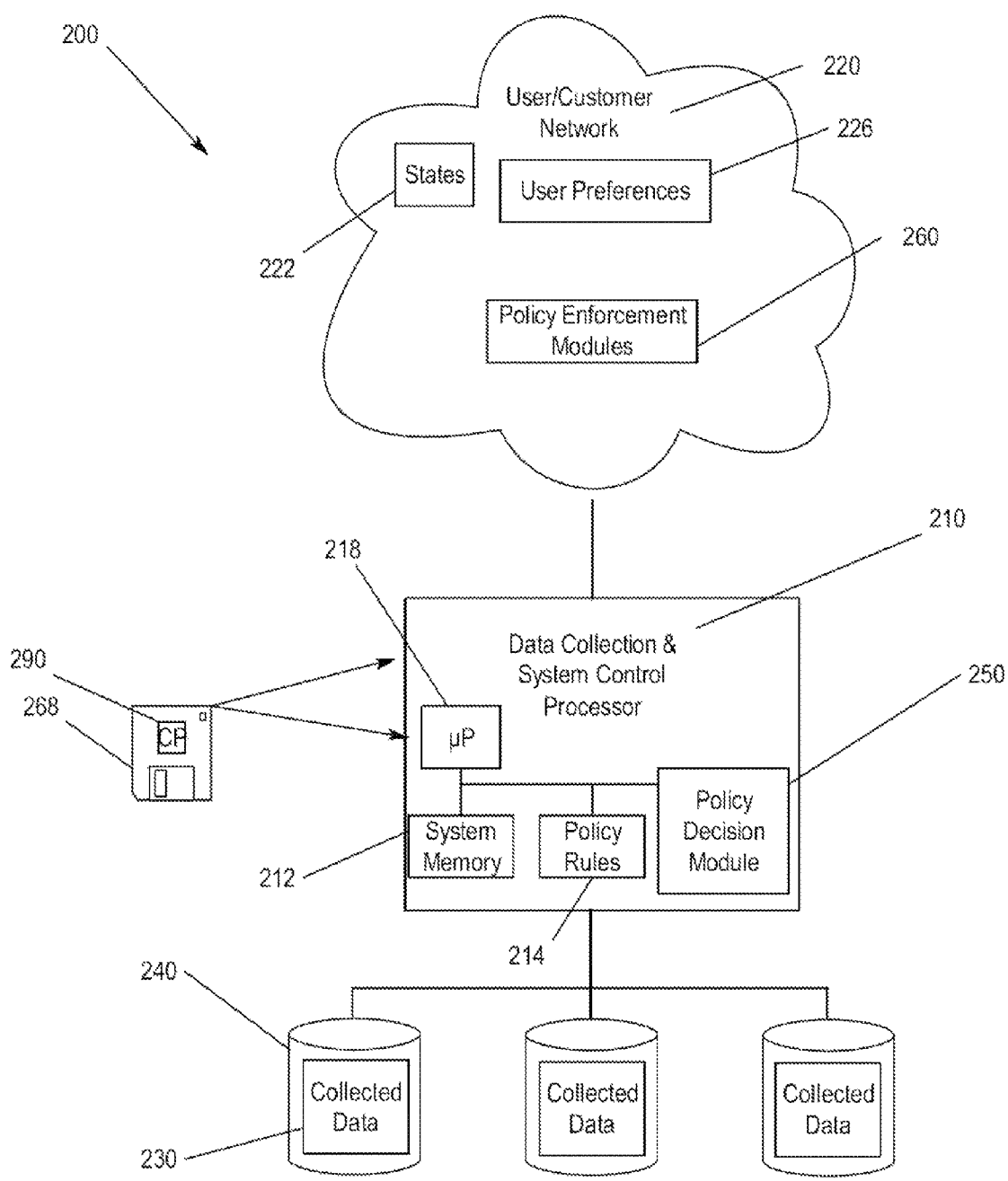
FIG. 2 illustrates a system for providing quality of service optimization via policy-based rearrangements according to an exemplary embodiment.

FIG. 2 illustrates a system 200 for providing quality of service optimization via policy-based rearrangements according to an exemplary embodiment. The architecture may be configured as a distributed policy-based architecture wherein data collection and system control processor 210 gathers information from across the network of users 220 and distributed policies and profiles are created. The data collection and system control processor 210 also obtains the user preferences 226 and builds profiles on users based on the activities of the users. The data collection and system control processor 210 collects and controls the system based upon collected data 230. The data collection and system control processor 210 includes memory 212, policy rules 214, a policy decision module 250 and a processor 218. The processor 218 controls the functions, analysis and manipulation of collected data 230 and applies policy rules 214. The policy decision module 250 is used to adjust the quality of service for users to meet QoS of the users based upon the collected data 230. The processor 218 uses the policy rules 214, the collected data 230 and the policy decision module 250 to identify suggestions or network changes to make adjustments in the quality of service for different users. Moreover, the processor 218 provides automatic determination of rearrangement possibilities, evaluation and ranking of rearrangements and generation of metrics for each possibility.

Determination of suitable rearrangements may be based on metrics and/or on user-related acceptability information. The processor 218 selects and implements the best feasible rearrangement to preserve service quality as conditions change. Policy rules 214 plus enforcement points 260 in applications enables a service provider to adjust the quality of service for different uses to meet the demand of other users. As shown in FIG. 2, a data collection and system control processor 210 includes a policy decision module 250 that makes decisions based on the collected data 230. Based upon the collected data 230, the data collection and system control processor 210 may identify different system states 222, such as the state of the network, various states of network-related equipment such as routers and firewalls, various states of service-related equipment such servers, the state of a service provided to a user, even the state of a customer, or other more fine-grained managed object states. The data collection and system control processor 210 may also identify functions, services, event suggestions, etc. that may be of interest to a customer. Inferences regarding what users like, need, and would be inclined to prefer can also be obtained.

To accomplish the operations of embodiments, the policy enforcement functions 260 may be used to activate or implement the identified services or functions as discussed herein. The policy decision module 250 provides input to the processor 218 to allow automatic setting and adjustment of potential degradation levels, such as quality reduction, depending on application, service, user, device, and group. The policy decision module 250 also provides input to the processor 218 to allow automatic inference of the degree of degradation acceptable to each user. The policy rules 214 define rules for implementing rearrangements for providing the required QoS for the users. Policy rules may be used by the policy decision module 250 to make the many decisions required to form alternatives, select users to degrade or not, determine how much degradation can be applied to each user, etc. so as to obtain the proper degradation.

The processor 218 uses the policy rules 214, the collected data 230 and the policy decision module 250 to generate multiple alternative rearrangements. Such rearrangements may include parameter changes, connection changes, network routing changes, changing networks, etc. Then, each option is evaluated using common metrics. The optimal choice is selected and implemented such that degradations are avoided, and where possible, users remain unaware of the changes. Multiple alternatives may be generated by identifying the scope of users who may be affected, and applying rearrangement rules to suggest changes that would achieve QoS preservation. Metrics may include basic performance measures, e.g., connectivity, bandwidth, etc., as well as QoS-specific measures, e.g., delay, jitter, etc. Selection may include the processor 218 choosing a good set of metrics, but also allows the processor 218 to consider the effects on users grouped into profiles, wherein there is a set of rules and metric-related thresholds for each profile. The processor 218 may use optimization algorithms to select the final rearrangement.

Moreover, when multiple users share resources, the processor 218 may not be able to enhance or even preserve a user's quality without rearranging the resources associated with other users' service. In addition, there may be considerable benefits to allowing the processor 218 to rearrange resources associated with other users' service. The need for the processor 218 to rearrange services may be triggered when the "available resources" change, such that users can no longer be comfortably served with the quality they need or desire, when a previously idle user decides to use a service and/or application, especially a QoS-sensitive service and/or application, when users can no longer be comfortably served with the quality they need or desire, and when the continued usage of services and/or applications causes consumption of resources to grow beyond a comfortable threshold such that users can no longer be comfortably served with the quality they need or desire. Whenever possible, the processor 218 should avoid making any noticeable impact on other users when rearranging services. Whenever the processor 218 notices an error condition, the processor 218 halts the rearrangement process and reverts to a last known working condition.

Rearrangement of services is especially desirable when taking away bandwidth or other services from one or more users does not provide the level of quality desired by another of the users. The processor 218, based upon the needs of the users and the policy rules, might actually shift a connection of a user from one network to another or from one service provider to another. The processor 218 analyzes entire rearrangements including bandwidths, routers, and servers so that when a switch is made to an entirely different network, the different infrastructure must be accounted for. The processor 218 measures different metrics applies the rules to take into account how customers will react. Thus, the best rearrangement is one that causes slight differences for people, but they do not really notice anything.

In terms of rearrangements, the processor 218 may move a user from a cell phone connection onto a WIFI network, move a WIFI network user to a cell phone connection, rearrange routes, rearrange which server a user is connected to, etc. All of the rearrangements must be coordinated. If customer input is needed, the processor 218 may need to query several customers because there might be users that are not even part of the group associated with the customer that you are trying to help, but that somehow are inadvertently affected. Since the group of people that may need to be contacted could be very large, the best rearrangement is to automatically implement rearrangements that users do not really notice. To accomplish the optimal rearrangement of resources, changes may need to be made that are not straightforward. Thus, the processor 218 may be required to make measurements when making the rearrangements to ensure that the metrics meet the policy rules and achieve the goal of the rearrangement.

FIG. 2 shows only one embodiment. However, embodiments may take the form of an entirely software embodiment or an embodiment containing both hardware and software elements. Embodiments may be implemented in software that includes, but is not limited to, firmware, resident software, microcode, etc. Furthermore, other embodiments may take the form of a computer program product 290 accessible from a computer-usable or computer-readable medium 268 providing program code for use by or in connection with a computer or any instruction execution system.

For the purposes of this description, a computer-usable or computer readable medium 268 can be any apparatus that can contain, store, communicate, propagate, or transport the program for use by or in connection with the instruction execution system, apparatus, or device. The medium 268 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code for providing data collection and system control according to an exemplary embodiment may include at least one processor 210 coupled directly or indirectly to memory elements 212. The memory elements 212 can include local memory employed during actual execution of the program code, bulk storage, and cache memories which provide temporary storage of at least some program code in order to reduce the number of times code must be retrieved from bulk storage during execution.

Accordingly, the computer program 290 comprise instructions which, when read and executed by the system 200 of FIG. 2, causes the system 200 to perform the steps necessary to execute the steps or elements of embodiments. Moreover, the functionality associated with the processor 218 for providing data collection and system control 210 may be centralized or partially to fully distributed and included in any piece of equipment or any portion of software in the system 200. Accordingly, the data collection and control framework may be distributed across the system 200. Further, the data collection and control 210 may be configured as an overlay over the system infrastructure to offer the services, functions and suggestions discussed above. Still further, the interaction with decision makers may be automated, semi-automated, or manual.

Figure 3:
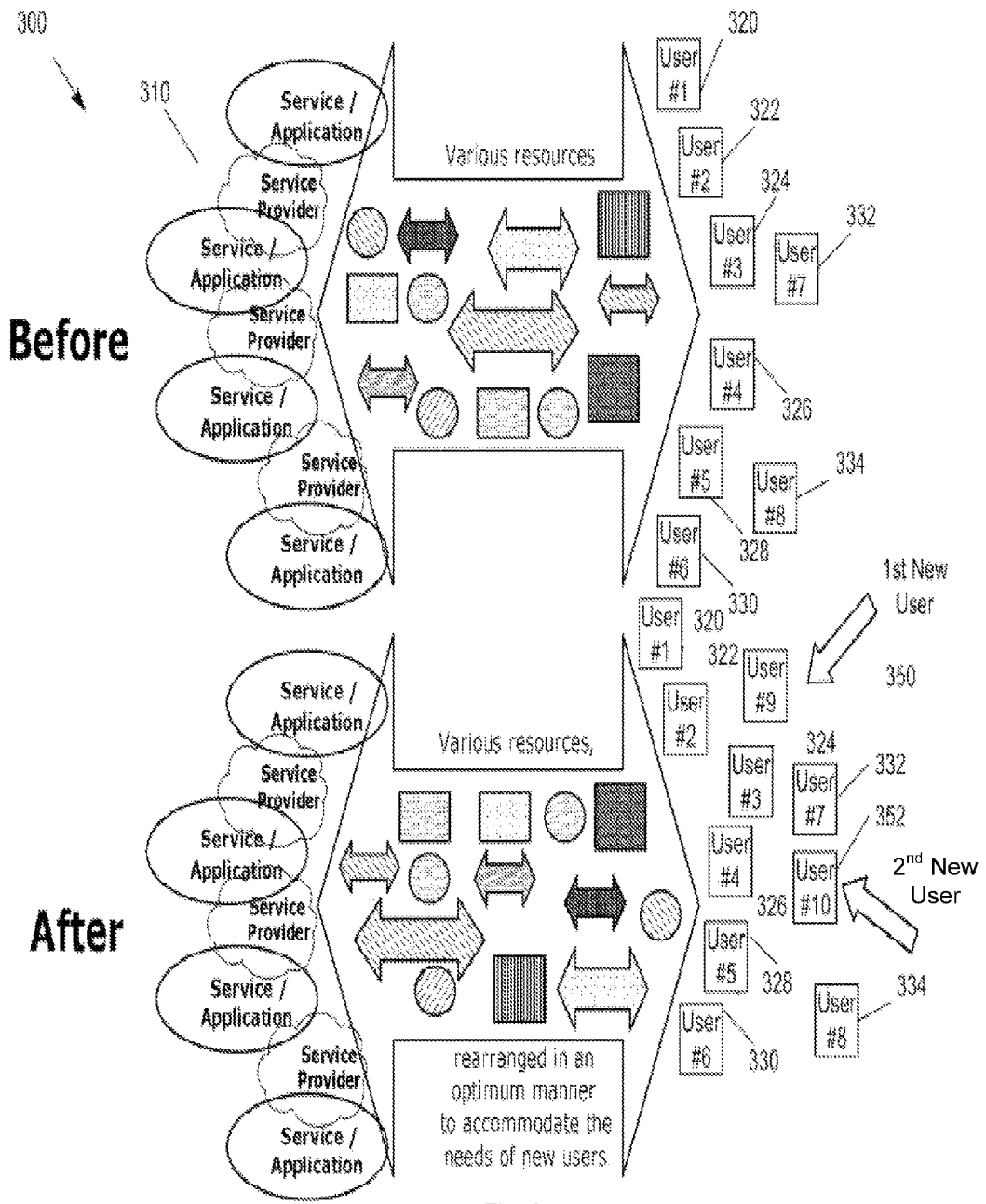
FIG. 3 illustrates a method for applying quality of service optimization via policy-based rearrangements according to an exemplary embodiment.

FIG. 3 illustrates a method 300 for processor controlled application of quality of service optimization via policy-based rearrangements according to an exemplary embodiment. In FIG. 3, a before example shows service providers 310 are servicing 8 customers 320-334. Various resources 340 from service providers 310 are used to service the 8 customers 320-334. In FIG. 3, the after example shows the addition of two new users 350, 352. As can be seen by comparing the arrangement of resources 340 in the arrow 360 to the arrangement of resources 340 in arrow 362, the arrangement of resources 340 in the arrow 360 have been rearranged so that new users 350, 352 can obtain service quality meeting their needs without degrading the quality of other users 320-334. Thus, the resources 340 are rearranged in an optimum manner to accommodate the needs of new users 350, 352.

Figure 4:
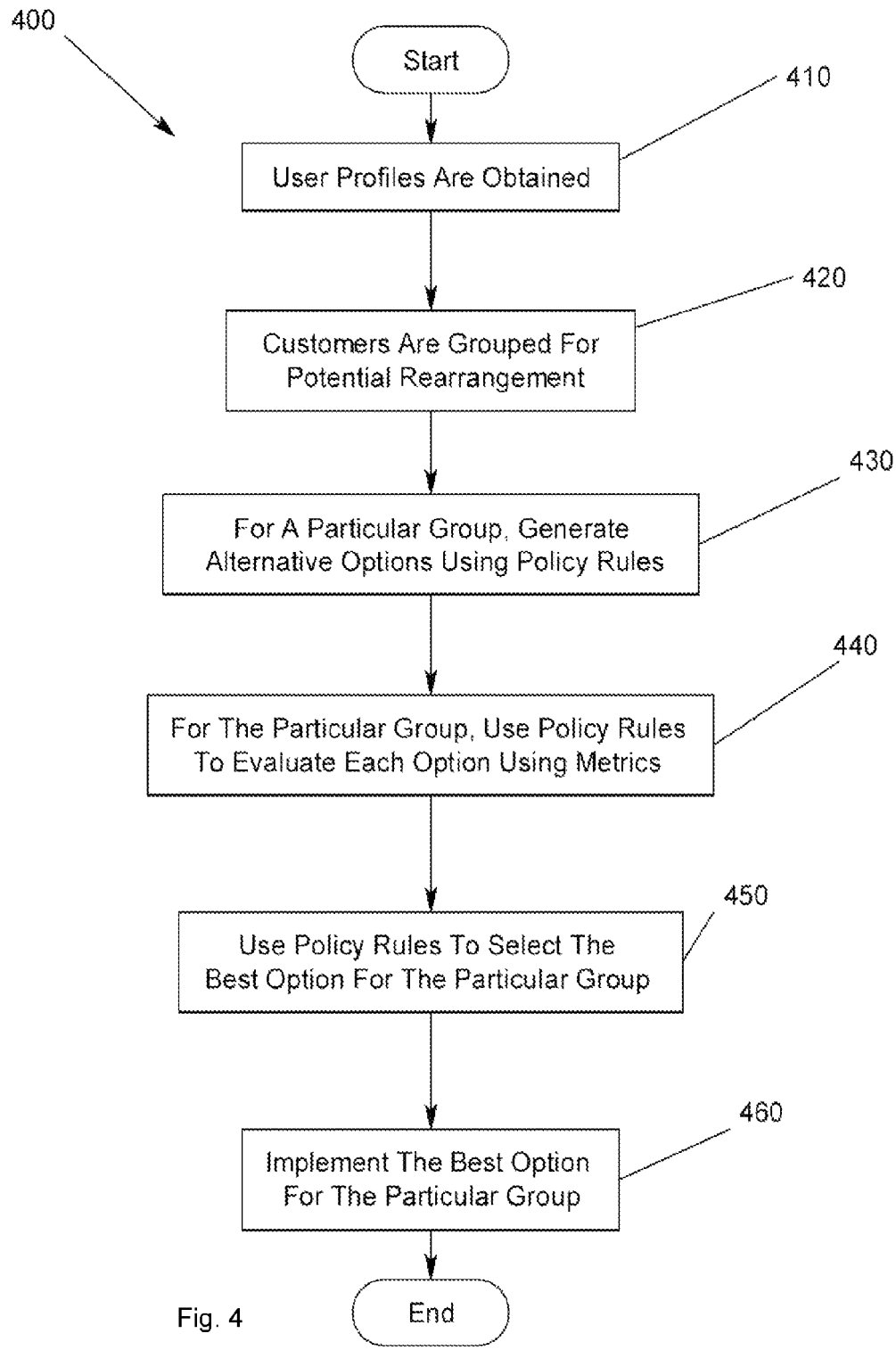
FIG. 4 is a flow chart of a method for providing broad quality of service optimization using policy-based selective quality degradation according to an exemplary embodiment.

FIG. 4 is a flow chart 400 of a method for processor controlled provisioning of broad quality of service optimization using policy-based selective quality degradation according to an exemplary embodiment. In FIG. 4, user profiles are obtained 410. For example, user profiles may be obtained from a user policy system and/or other system that supports profile/profiling, from one or more sign-up processes, via web page or other interactive capability, etc. The user profile includes information about the customer and the customer's group, e.g., family, business type and size, etc. Customers are grouped for potential rearrangement 420. Examples of groupings include users in a home, business location, neighborhood, collections of neighborhoods, metro area, or even a region. A grouping of users is users that share service provider resources. For a particular group, generate multiple alternative options using policy rules 430. Policy rules may include rearranged resources, network and/or application/service parameter changes, network/network connection changes, e.g., a change from a broadband DSL network to a Metro WiMax network, network routing changes, etc. The scope of users that may be affected may be identified. Changes that would achieve QoS preservation may be suggested by applying rearrangement rules.

For the particular group, policy rules are used to evaluate each option using common metrics 440. Metrics may include basic performance measures, e.g., connectivity, bandwidth, etc., QoS-specific measures, e.g., delay, jitter, etc., values of determined metrics, estimations, algorithms, modeling, and simulations if necessary. Metric values may be combined using a weighted summation to obtain an overall rating for each option. Next, policy rules are used to select the best option for the particular group 450. The effects on users grouped into profiles should be considered. A set of policy rules and metric-related thresholds for each profile may be used. The effects on users grouped into profiles should be considered when profiles address such things as a premium vs. a regular user, a business user vs. a home user, a gamer vs. an email user, etc. The option with the best set of metric values, e.g., best overall rating, should be optimized and chosen. The best option for the particular group should be implemented 460. For instance, the best option for the particular group should be implemented via a distributed policy architecture that includes policy enforcement points, etc.

Accordingly, devices, methods and computer-readable media provide broad quality of service optimization using policy-based selective quality degradation according to an exemplary embodiment. A processor uses the policy rules, the collected data and the policy decision module to generate multiple alternative rearrangements. Such rearrangements may include parameter changes, connection changes, network routing changes, changing networks, etc. Then, each option is evaluated using common metrics. The optimal choice is selected and implemented such that degradations are avoided, and where possible, users remain unaware of the changes.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A device comprising:
   a controller; and
   memory, coupled to the controller, the memory having executable instructions stored thereon that when executed by the controller cause the controller to effectuate operations comprising:
   grouping customers for rearrangement, wherein groupings comprise users in a home, business location, users in a neighborhood, users in a collections of neighborhoods, users in a metro area, and users in a region;
   generating multiple alternative options for a particular group using policy rules;
   using policy rules for the particular group to evaluate each option using common metrics, the common metrics comprising a measure of performance based on connectivity, a measure of performance based on bandwidth, a measure of performance based on a specific quality of service, a measure of performance based on delay, and a measure of performance based on jitter;
   using policy rules to select the best option for the particular group, wherein the best option for the particular group comprises at least one of moving a call connected to a cellular network to a WIFI network or moving a call connected to a WIFI network to a cellular network; and
   implementing the best option for the particular group.

2. The device of claim 1, wherein the memory comprises policy rules and metric-related thresholds for at least one user profile.

3. The device of claim 2, wherein the at least one user profile comprises user profiles obtained from at least one of:
   a user policy system; or
   a system that supports profiling from a sign-up process.

4. The device of claim 2, wherein the at least one user profile comprises information about customers and information about the customer groups.

5. The device of claim 1, wherein users share service provider resources.

6. The device of claim 1, wherein the policy rules include at least one of rearranged resources, parameter changes, connection changes, or network routing changes.

7. The device of claim 1, wherein metrics comprise at least one of basic performance measures, QoS-specific measures, values of determined metrics, estimations, algorithms, modeling, or simulations.

8. The device of claim 1, wherein metric values are combined using a weighted summation to obtain an overall rating for each rearrangement option.

9. A tangible computer-readable storage medium having executable instructions stored thereon that when executed by a processor cause the processor to effectuate operations comprising:
   storing user profiles;
   grouping customers for potential rearrangement, wherein the grouping customers for potential rearrangement comprises grouping users in a home, users in a business location, users in a neighborhood, users in a collections of neighborhoods, users in a metro area, and users in a region;
   generating multiple alternative options for a particular group using policy rules;
   using policy rules for the particular group to evaluate each option using common metrics, the common metrics comprising a measure of performance based on connectivity, a measure of performance based on bandwidth, a measure of performance based on a specific quality of service, a measure of performance based on delay, and a measure of performance based on jitter;
   using policy rules to select a best option for the particular group, wherein the best option for the particular group comprises at least one of moving a call connected to a cellular network to a WIFI network or moving a call connected to a WIFI network to a cellular network; and
   implementing the best option for the particular group.

10. The tangible computer-readable storage medium of claim 9, wherein the storing further comprises storing policy rules and metric-related thresholds for at least one user profile.

11. The tangible computer-readable storage medium of claim 10, wherein the at least one user profile comprises user profiles obtained from at least one of:
   a user policy system; or
   a system that supports profiling from a sign-up process.

12. The tangible computer-readable storage medium of claim 10, wherein the at least one user profile further comprises information about customers and the customer groups.

13. The tangible computer-readable storage medium of claim 9, wherein users share service provider resources.

14. The tangible computer-readable storage medium of claim 9, wherein the policy rules comprise at least one of rearranged resources, parameter changes, connection changes, or network routing changes.

15. The tangible computer-readable storage medium of claim 9, wherein metrics comprise at least one of basic performance measures, QoS-specific measures, values of determined metrics, estimations, algorithms, modeling, or simulations.

16. The tangible computer-readable storage medium of claim 9, the operations further comprising combining metric values using a weighted summation to obtain an overall rating for each rearrangement option.

17. A method comprising:
   storing user profiles in a computer memory;
   grouping customers for rearrangement, wherein groupings include users in a home, users in a business location, users in a neighborhood, users in a collections of neighborhoods, users in a metro area, and users in a region;
   generating multiple alternative options for a particular group using policy rules;
   using policy rules for the particular group to evaluate each option using common metrics, the common metrics comprising a measure of performance based on connectivity, a measure of performance based on bandwidth, a measure of performance based on a specific quality of service, a measure of performance based on delay, and a measure of performance based on jitter;
   using policy rules to select a best option for the particular group, wherein the best option for the particular group comprises at least one of moving a call connected to a cellular network to a WIFI network or moving a call connected to a WIFI network to a cellular network; and
   implementing the best option for the particular group.

18. The method of claim 17, wherein the storing further comprises storing at least one of policy rules, customer and customer group data, metric-related thresholds for each user profile, or obtained user profiles.

* * * * *